April 3, 1962 W. PÜSCHEL ET AL 3,028,238
COLOR PHOTOGRAPHY
Filed Jan. 27, 1958
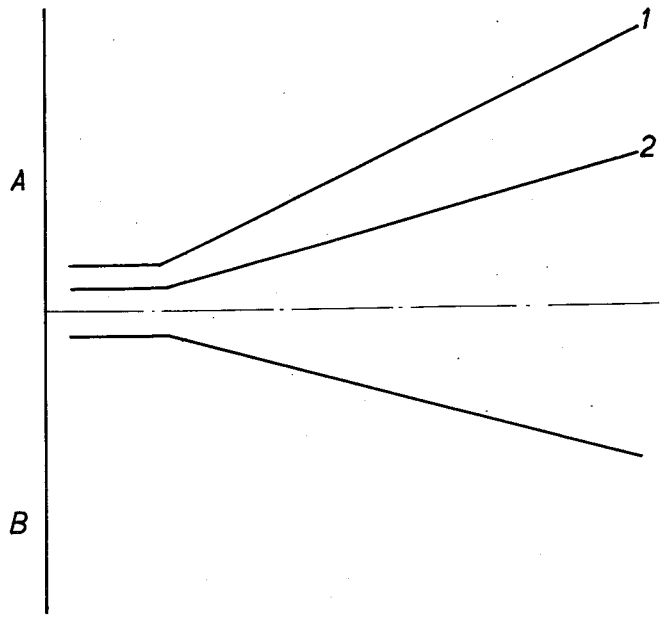
INVENTORS:
WALTER PÜSCHEL, OTTMAR WAHL, WILLIBALD PELZ, HANS SCHELLENBERGER
BY
their ATTORNEYS

United States Patent Office 3,028,238
Patented Apr. 3, 1962

3,028,238
COLOR PHOTOGRAPHY
Walter Püschel, Dusseldorf, Ottmar Wahl and Willibald Pelz, Opladen, and Hans Schellenberger, Leverkusen, Germany, assignors to Agfa Aktiengesellschaft, Leverkusen, Germany, a corporation of Germany
Filed Jan. 27, 1958, Ser. No. 711,412
Claims priority, application Germany Jan. 29, 1957
14 Claims. (Cl. 96—53)

The present invention relates to color photography and more especially to color photography making use of colored couplers.

Processes are already known by which colored direct positive images are obtained, one of these processes being the silver dye bleach process. The processes can also be used for making masks, especially for color photographic purposes. The dyes formed in the usual color photographic processes do not conform to the conditions which are theoretically required. For example, magenta dyes have a considerable secondary absorption in the blue zone, while cyan dyes have secondary absorptions in the green and blue zones. Descriptions have been published of a number of processes which improve the properties of the dyes by masking the secondary densities. It is only the processes in which the mask image is an integral constituent of the color photographic material used which have any relationship to the present process. The said processes are based on the use of color couplers the natural absorption of which corresponds to the defective absorption of the dyes being formed from them in the color photographic process, such as described in U.S. Patent No. 2,449,966 and British patent specification No. 698,046. These masks operate automatically. They have the disadvantage that owing to the high extinction power of the dyes used (for example azo dyes of pyrazolones), the color density necessary for masking purposes is reached with concentrations of the component which are still too low for producing the necessary gradation or sensitivity. Considerable matching difficulties arise, which are said to be obviated by the process according to U.S. Patent No. 2,725,291, in which azo-bis-pyrazolones with a less intense coloring are used. This process however is not applicable for the production of other colored direct positive images.

It has now been found that colored direct positive images of an object or of a printing original can be produced in a silver halide emulsion layer, by exposing said layer to the object to be reproduced and developing said exposed layer with a color forming developer, such as a primary aromatic amino developing substance, in the presence of a colored coupler which is transformed by the oxidation product of the color forming developer into colorless products, whereby a direct positive color image is obtained in the undeveloped regions of said layer.

Such substances are for example obtained from such couplers with activated methylene groups as have a hydrogen atom of the activated methylene groups substituted, by coupling such a compound with a diazonium salt. Couplers with activated methylene groups in which a hydrogen atom of the activated methylene group is substituted and which give colorless coupling compounds with oxidized color developers have been disclosed in copending application Ser. No. 681,893 filed September 4, 1957, in the name of Walter Püschel.

Suitable color couplers of the present invention are couplers for the color forming development having an active methylene group, one of the hydrogen atoms of said methylene group being substituted by a radical selected from the group consisting of alkyl, cycloalkyl, aryl and aralkyl groups and the other hydrogen atom of said active methylene group being substituted by the azo group of an azo group containing radical. These compounds may for instance be represented by the following formulae:

(1) 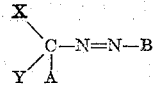

(2) 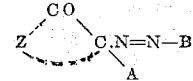

(3) 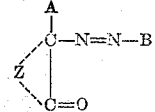

wherein X and Y are negative groups such as —COR, —COOR, —CO.COOR, —CONR$_1$R$_2$, —CO.CO.NR$_1$R$_2$, —CH=CHR, —CN, —NO$_2$, —SO$_2$R, phenyl groups which may be substituted such as by nitro-, halogen-, alkyl-, SO$_3$H—, COOH— groups, heterocyclic radicals, R, R$_1$ and R$_2$ standing for hydrogen or a monovalent aliphatic aromatic or heterocyclic radical such as methyl, ethyl, propyl, cyanomethyl, phenyl, substituted phenyl, pyridyl, benzthiazolyl; A stands for a monovalent organic radical which is not split off by color development, preferably an alkyl, cycloalkyl, aralkyl, aryl radical such as methyl, ethyl, propyl, sulfoethyl (—C$_2$H$_4$SO$_3$H), carboxymethyl (—CH$_2$.COOH), cyclohexyl, benzyl, phenyl, naphthyl, B stands for an aryl or a heterocyclic radical, such as phenyl which may be substituted as for instance by an alkyl (CH$_3$, C$_2$H$_5$, C$_3$H$_7$), a hydroxy, sulfonic acid, nitro, carboxylic acid, sulfonamide, acylamide, tertiary amino, halogen group; and Z represents the atoms necessary to complete an isocyclic or heterocyclic ring, preferably a five or six membered ring. The aforementioned compounds may be produced by coupling diazonium salts derived from aromatic or heterocyclic compounds in a liquid medium, preferably in an aqueous medium, with color couplers having an active methylene group one hydrogen atom of which is substituted as disclosed above. The pH value of the aqueous medium is preferably adjusted to about 5 to 11.

Suitable coupling components are for instance: nitriles, esters, amides, hydrazides, hydroxamic acids and other derivatives of acylacetic acids, malonic acid, cyanoacetic acid, phenylsulphonyl acetic acid; aliphatic and cyclic 1,3-diketones such as acetylacetone, cyclohexanedione, α-cyanketones such as cyanacetylbenzene, nitrodiphenylmethanes, such as 4-nitrodiphenylmethane, o- and p-nitrobenzylcyanides, indandiones, cyclopentanone- and cyclohexanone-2-carbonic and oxalic acid derivatives such as nitriles, esters, amides; pyrazolones; isoxazolones; 1,2,3-triazolones; oxindoles; coumarones; oxythionaphthenes; oxycarbostyrils; thiohydantoines; N-substituted rhodanines; benzimidazoles, benzoxazoles, benzthiazoles, 1,3,4-oxadiazoles, 1,3,4-thiodiazoles, pyrimidines, quinolines, quinazolines, quinazolones substituted in the 2 position by a CH$_2$CO.R$_1$ group (R$_1$ standing for alkyl, aralkyl, aryl, amide, hydrazide, hydroxamino or an ester group) or by a CH$_2$CN group; 1,2,4-oxodiazoles, 1,2,4-thiodiazoles, isoquinolines which are substituted in the 3-position by a CH$_2$COR$_1$ (R$_1$ having the same meaning as above) or by a CH$_2$CN group, all these compounds being substituted in the reactive methylene group by the substituent A disclosed above. (Compare U.S. Patents 2,323,503, 2,323,504, 2,668,112, 2,435,173, British patent specification 674,103, and French Patents 969,826 and 852,803.)

Further suitable compounds are compounds of the general formula:

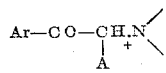

Ar standing for an aromatic radical and N for the quaternary nitrogen atom of a heterocyclic ring such as pyridine or quinoline, A having the same meaning as above (compare U.S. Patent 2,154,918).

The dyes used according to the invention are for example obtained by coupling 1 mole of diazotized 4-chloraniline-3-sulphonic acid with 1 mole of cyclopentanone-(1)-2-carboxylic acid anilide,
1 mole of tetrazotized 4,4'-diaminostilbene-2,2'-disulphonic acid with 2 moles of cyanogen ethyl malonic ester,
1 mole of diazotized 4-aminonitrostilbene-2,2'-disulphonic acid with 1 mole of cyclopentanone oxalylic acid ester,
1 mole of tetrazotized 4,4'-diaminostilbene-2,2'-disulphonic acid with 2 moles of 1-benzthiazolyl-3,4-dimethyl pyrazolone-(5),
1 mole of tetrazotized 4,4-diamino-3,3'-dimethoxy diphenyl-2,2'-disulphonic acid with 2 moles of α-hydrindone-β-oxalylic ester,
1 mole of tetrazotized 4,4'-diaminostilbene-2,2'-disulphonic acid with:
2 moles of cyclopentanone-2-carboxylic acid ethyl ester,
Cyclopentanone-2-carboxylic acid anilide,
α-Hydrindone-β-oxalylic acid ethyl ester,
α-Tetralone-β-oxalylic acid methyl ester,
Cyclohexanone-2-carboxylic acid ethyl ester,
Cyclohexanone-2-oxalylic acid anilide or
Benzoyl-α-methyl-acetic acid ethyl ester
1 mole of tetrazotized 4,4'-diamino-3,3'-dimethoxy diphenyl-2,2'-disulphonic acid with:
2 moles of 1-phenyl-3,4-dimethyl pyrazolone-(5),
α-Hydrindone-β-oxalylic acid ester, or
1 - (4' - sulphophenyl) - 3 - phenyl - 4 - methyl pyrazolone-(5),
1 mole of cyclopentanone-2-carboxylic acid-(4'-methyl stearyl amino-3'-sulphonic acid)-anilide with 1 mole of diazotized:
4-chloroaniline-3-sulphonic acid,
Aniline-3-sulphanilide,
Aniline-3-sulphamide,
4-nitroaniline-3-sulphonic acid, or
2-chloro-5-aminobenzoic acid,
1 mole of 1-phenyl-3-amino-4-methyl pyrazolone-(5) with 1 mole of diazotized 4-chloro-2-aminophenyl-5-sulphonic acid.

The process of the present invention is particularly suitable for the production of masks for color photographic purpose. In this connection, it is for example possible for the compound according to the invention to be incorporated into a separate and suitably sensitized silver halide emulsion layer of a multi-layer material as the alkali metal or other water-soluble salts or after being incorporated in a water permeable, water insoluble solvent as described for instance in U.S. Patents 2,304,940 and 2,322,027. Upon color development of the photographically exposed material a masking image is obtained in said separate layer whereas partial color images are produced in the other layers. In this way, it is possible to produce the same automatic masking effect as is obtained with the prior known colored couplers. One particular advantage of the process of the present invention is that the aforementioned matching difficulties cannot arise, since the color coupling process takes place separately from the masking process associated therewith. It is true that it was previously known that such a process is desirable for an effective masking effect, but so far no effective methods of carrying out such a process have existed in practice.

In order clearly to show the particular method of operation of the process of the present invention, the known process of automatic masking will be compared with the automatic masking produced by the process of the present invention. According to the known process, an azopyrazolone (a colored color coupler) is incorporated into a photographic silver halide emulsion layer. After the layer is exposed to light, a magenta dyestuff image is obtained during subsequent color development said dyestuff having a secondary absorption in the blue region of the spectrum with a gradation specific for the coupler concerned. Simultaneously with the magenta dyestuff image, a yellow dyestuff image with a color corresponding to that of the undesired secondary absorption is obtained from the unused residual color coupler, with a gradation opposite to the gradation of the secondary absorption. The gradations are represented in the accompanying FIGURE 1. $A_1$ represents the gradation of the magenta image with its main absorption in the green, $A_2$ represents the gradation of the undesired secondary absorption in the blue and B represents the gradation of the yellow masking image, namely the unreacted residue of the colored coupler.

In contrast thereto, according to the present invention colored compounds are used in which the step 2 (formation of the dyestuff with a gradation opposite to that of the secondary absorption) proceeds of itself and independently of the dyestuff formation.

For masking the secondary absorption accompanying the magenta dyes, the procedure in accordance with the present invention is as follows:

A diffusion-resisting yellow dye is incorporated into a layer disposed adjacent to a green-sensitized silver halide layer which contains a diffusion-resisting magenta coupler, the said yellow dye being bleached by the oxidized color developer. The color development then produces the dye image in one layer and the masking image separately in the other layer.

The advantage of this process is obvious. Whereas in the prior processes the opposite gradation of the masking image is dependent on the gradation of the associated partial dyestuff image it is possible with the process of the invention for the mask density and mask gradation to be freely controlled by varying the dye concentration and the layer thickness, for example.

The same of course applies in analogous manner for the masking of the cyan image. It is not essential for the coupler and for the dyes to be arranged in separate layers; they can also be incorporated together into the same layer. The incorporation may be effected by adding the components to the coating solution by bathing the exposed or unexposed layer with solutions containing one or both said components or by adding the compounds to the developing solutions. Another possibility of application of the dyes (colored couplers) consists in fixing the initial component for formation of the dye in a photographic layer and in producing the dye by immersion of the layer in a bath containing a diazonium salt prior to or following the exposure.

The dyes can contain substituents producing a diffusion-resisting effect, for example alkyl radicals having at least five, preferably at least twelve carbon atoms. They can if desired contain groups giving a substantive action or be fixed with mordants in the layer.

The dye layer can at the same time be arranged to act as a yellow filter layer.

The conventional color developers can be used for developing the color photographic materials in accordance with the invention. Developers which it is advantageous to use for this purpose are the known p-phenylene diamines, 4-aminopyrazolones and 1-(4-amino-phenyl)-3-aminopyrazolines. The development can be followed by all the processing steps usual or necessary in color photography. The process can be used with any desired multilayer material, a large number of possibilities being available because of the number of possible ways of varying the layer sequence. The masking layer can for instance be used simultaneously as an antihalation layer and be arranged on the front side or on the backside of the layer support.

The density of the masking image may be influenced by the choice of the bleaching bath used for removing the silver image. In case that bleaching and fixing baths according to German Patent 866,605 (solutions of fixing agents and complex ferri salts) are used the original density of the masking image is preserved. If however stronger bleaching baths are applied such as solutions of potassium ferricyanide the density and in consequence thereof also the gradation of the masking image is increased considerably. This makes it possible to adjust the gradation of the masking image by proper choice of the bleaching bath and of the bleaching time. Bleaching times of 2 to 20 minutes having proven to be especially valuable. The application of baths having a relative strong bleaching action is of special importance in combination with silver halide emulsion layers containing dyes (colored couplers) which are produced by mean of diazonium salts containing no auxochrome groups, these dyes being of comparatively low density. Such layers when incorporated into multi-layer materials have only a negligible filtering action and therefore during exposure influence the sensitivity of layers arranged below then if at all only to a slight degree. They are however transformed into intensively colored masking images by application of a strong bleaching bath after development.

The dyes are preferably applied in amounts of 1–20 g. per litre of silver halide emulsion or 0.1 to 10 g. per litre of developing solution.

*Example 1*

Arranged on a film support are (a) A red-sensitive silver halide emulsion layer having incorporated therein a diffusion-resistant cyan coupler, for example 4-sulfon-1-naphthol-2-carboxylic acid stearyl anilide,
(b) A green-sensitive silver halide emulsion layer having incorporated therein a diffusion-resistant magenta coupler, for example 1-(4'-sulfonphenyl)-3-palmitylpyrazolone-(5),
(c) A yellow filter layer,
(d) A blue-sensitive silver halide emulsion layer having incorporated therein a diffusion-resistant yellow coupler, for example 4-stearylamido-benzoyl acetic acid-amido-isophthalic acid.

The yellow filter layer serves for the production of an integral mask and consists of a green-sensitised silver halide layer into which are incorporated, per kg. of emulsion, 6 g. of a yellow coupling product obtained from tetrazotised 4,4'-diaminodibenzyl-2,2'-disulphonic acid and cyclopentanone-2-oxalylic acid ethyl ester, said compound having the probable formula:

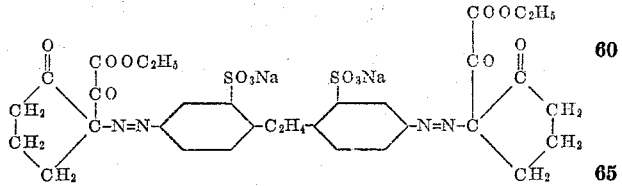

The photographically exposed multi-layer material is developed in a color developer having the following composition:

| | |
|---|---|
| 4-amino diethylaniline sulphate | 2.50 |
| Anhydrous potassium carbonate | 70.00 |
| Potassium bromide | 2.00 |
| Anhydrous sodium sulphite | 2.00 |
| Water litre | 1 |

Development is followed by application of a bleaching and fixing bath according to Example 6 of German patent specification 866,605 as in the well known practice.

The processed material contains negative yellow, magenta and cyan partial images in the image layers and a positive yellow image in the filter layer.

This image can be printed onto a multi-layer printing material to obtain positive color corrected multi-layer images.

The above dye is produced as follows:

4.1 g. of 4,4'-diaminodibenzyl-2,2'-disulphonic acid are suspended in 500 cc. of water and brought into solution by the addition of 2 N sodium hydroxide. The solution is filtered to remove any undissolved residue and 14 g. of sodium nitrite are added to the clear solution. The solution is then cooled to 5–10° C. and diazotized by the slow addition of 40 cc. of concentrated hydrochloric acid. The resulting suspension of the diazonium salt is incorporated by stirring, at room temperature and over a period of 5 minutes, into a thoroughly stirred emulsion of a mixture of 40 g. of cyclopentanone-2-oxalylic-acidethylester and 250 cc. of methanol in 1000 cc. of 10% soda solution. Initally, all the solid material dissolves, but after a time the dye starts to precipitate, and this precipitation can be completed by adding saturated sodium chloride solution.

By following these instructions, it is also possible to prepare the dyes of the following examples.

*Example 2*

In a multi-layer material as described in Example 1, the yellow filter layer is sensitized to green and red, and the coupling product of tetrazotized 4,4'-diaminostilbene-2,2'-disulphonic acid with methyl cyclohexanone oxalylethylester is added, this product being a yellowish red dye. The processing is as indicated in Example 1.

*Example 3*

In a multi-layer material as described in Example 1, 6 g. of a yellow coupling product obtained from tetrazotized 4,4'-diamino-3,3'-dimethoxy-2,2'-dibenzyl disulphonic acid and hydrindone oxalylic acidethylester is incorporated into the green sensitive layer in addition to the magenta coupler. The filter-layer in this case contains colloidal silver as filtering agent. The processing takes place as in Example 1.

*Example 4*

A green-sensitive silver halide layer has added thereto 6 g. of a yellow dye obtained from tetrazotized-4,4'-diaminostilbene-2,2'-disulphonic acid and 1-benzthiazolyl-3,4-dimethyl pyrazolone-(5). After exposure, development with a paraphenylene diamine developer, bleaching and fixing, a positive image of the copying original is obtained, the said image being yellow in colour.

*Example 5*

A phototechnical film, after being exposed and before being developed, is bathed in a dye solution one litre of which contains 4 g. of a dye obtained from tetrazotized 4,4'-diamino-dibenzyl-2,2'-disulphonic acid and cyclopentanone-2-oxalylic acid ethylester. After being treated in the bath, the film is developed, bleached and fixed in the usual manner, a yellow-colored positive image of the copying original being obtained.

*Example 6*

5.7 g. of 4-aminophenol sulphonic acid-2 are dissolved in 50 cc. of water and 32 cc. of 1 N sodium hydroxide, and 2.2 g. of sodium nitrite are added thereto. This solution is added dropwise to a mixture of 30 cc. of water and 15 cc. of hydrochloric acid at a temperature of 0–4° C. After half an hour, the excess of nitrite is destroyed by adding amidosulphonic acid and the solution is adjusted to a pH value of 6 by adding solid sodium acetate.

17.5 g. of 1-(5'-sulfo-benzthiazolyl-2')-3-heptadecyl-4-isopropyl-pyrazolone-5 are dissolved in 350 cc. of methanol by adding about 5 g. of sodium acetate. The aforementioned diazonium salt solution is added at a temperature of 15° C. A solid compound is immediately formed, which is filtered off with suction after 1 hour, is washed with water/methanol and is thereafter dried in a drier. The melting point is higher than 300° C. 10 g. of this compound are wetted with 15 cc. of methanol and then dissolved in 50 cc. of 3% sodium hydroxide solution and 500 cc. of water; the resulting solution is added to 1 kg. of a silver halide emulsion. The emulsion is cast on a film support and dried. Thereafter, the film is exposed, developed with a p-phenylene diamine developer usual for color film and bleached and fixed, after intermediate rinsing in a combined bleaching and fixing bath such as described for example in German patent specification No. 866,605 (Example 6), and then rinsed once more. A positive red image is obtained.

The 1-(5'-sulphobenzthiazolyl-2')-3-heptadecyl-4-isopropyl pyrazolone-5 is produced as follows:

α-Iso-propyl stearoyl acetic ester.—10 g. of stearoyl acetic acid ethyl ester and 200 g. of acetone are hydrogenated with Raney nickel at 50 atm. and 100° C. until a sample treated with dilute hydrochloric acid to give a precipitate no longer gives any color when melted with p-dimethyl amino-benzylaldehyde. The absorption then amounts to approximately 25 to 30 litres of hydrogen. The solution is stirred into 1 litre of ice water, the liquid is decanted after settling, and the solid obtained is again suspended in 1 litre of ice water, filtered off with suction and dried.

For condensing this compound to give the aforementioned 4-substituted pyrazolone, the procedure is the same as that described in German patent specification No. 904,137 in connection with the compound not substituted in the 4-position, except that the iso-propyl-β-ketoester is used instead of the β-ketoester.

Example 7

4.1 g. of 3-nitroaniline are mixed with 10 cc. of concentrated hydrochloric acid, 20 cc. of water and 20 g. of ice, the mixture is cooled to 0–4° C. and, while stirring, a solution of 2.2 g. of sodium nitrite in 15 cc. of water is added dropwise. When this solution has been added, stirring is continued for half an hour, the excess of nitrile is destroyed by adding amidosulphonic acid and solid sodium acetate is added until a pH value of 6 is reached. This solution is added while stirring at a temperature of 15° C. to the following solution:

16.5 g. of 1-(5'-sulfo-benzthiazolyl-2')-3-heptadecyl-4-methyl-pyrazolone-(5) dissolved in 300 cc. of methanol and about 5 g. of sodium acetate.

A solid substance immediately precipitates, and is filtered off with suction after about 1 hour and is washed with methanol/water. The compound decomposes on heating at 250–255° C.

For the production of the 1-(5'-sulfo-benzthiazolyl-2')-3-heptadecyl-4-methyl pyrazolone-(5), it is possible to use the process described for example in German patent specification No. 904,137, for the production of the compounds not substituted in the 4-position, except that the 2-methyl-stearoyl acetic ester is used instead of the stearoyl acetic ester.

The 2-methyl stearoyl acetic ester is produced as follows:

5.5 g. of sodium,
90 cc. of absolute ethanol, and
90 g. of stearoyl acetic ester are boiled for 1 hour,
40 g. of methyl iodide are added dropwise, and the resulting liquid is boiled under reflux for 2 hours and poured on to 500 cc. of water; the resulting mixture is submitted to extraction with ether, and the ether extract is dried and the ether evaporated.

16 g. of the above-described reaction product of 1-(5'-sulphobenzthiazolyl-2')-3-heptadecyl-4 - methyl - pyrazolone-(5) and nitrobenzene-diazonium chloride are dissolved as described in Example 6, and the resulting solution is added to 1 kg. of a silver halide emulsion; the emulsion obtained is cast on a film support and the resulting emulsion layer is dried. After exposure, the film is developed, rinsed, bleached, rinsed, fixed and rinsed in the manner usual for a color film, and a positive yellow image is obtained.

Example 8

7.3 g. of 2,5-dichloro-4-aminobenzene sulphonic acid-1 are diazotized in the usual manner and the diazotization product is coupled with 16.5 g. of 1-(5'-sulpho-benzthiazolyl-2')-3-heptadecyl-4-methyl pyrazolone-5, as described in Example 7. The melting point of the product is higher than 300° C.

16 g. of this product are dissolved as described in Example 6, and the resulting solution is added to a silver halide emulsion; the emulsion obtained is cast on a film support and the resulting emulsion layer is dried. The further processing is as set out in Example 7, and a positive yellow image is obtained.

Example 9

4.1 g. of 4-aminobenzoic acid are diazotised in the usual manner and the diazotization product is coupled with 16.5 g. of 1-(5'-sulpho-benzthiazolyl-2')-3-heptadecyl-4-methyl pyrazolone-5, as described in Example 7. The product decomposes at 65° C.

16 g. of this product are dissolved as in Example 6, and the solution is added to a silver halide emulsion; the emulsion obtained is cast on a support and the resulting emulsion layer is dried. The further processing is as set forth in Example 7, a yellow positive image being obtained.

Example 10

5.2 g. of 4-aminobenzene sulphonic acid-1 are diazotized in the usual manner and the diazotization product is coupled with 16.5 g. of 1-(5'-sulpho-benzthiazolyl-2')-3-heptadecyl-4-methyl pyrazolone-5 as described in Example 7. The compound becomes dark at 180° C. but does not melt up to 300° C. 16 g. of this compound are dissolved as in Example 6, and the resulting solution is added to a silver halide emulsion; the emulsion obtained is cast on a support and the resulting emulsion layer is dried. The further processing is as described in Example 7, a yellow positive image being obtained.

Example 11

4.8 g. of 4-amino-anisole hydrochloride are diazotized and added at 0° C. to a solution of 14.7 g. of 1-(4'-sulpho-phenyl)-3-heptadecyl-4-methyl pyrazolone-5 in 300 cc. of methanol and about 5 g. of sodium acetate. The resulting mixture is filtered with suction after 1 hour, and the residue is washed with methanol/water and dried.

The 1-(4'-sulpho-phenyl)-3-heptadecyl-4-methyl pyrazolone-5 is produced as follows:

200 cc. of methanol,
70 g. of 1-(4'-sulpho-phenyl)-3-heptadecyl pyrazolone-5,
84 cc. of aqueous 30% formalin solution, and
7 g. of anhydrous sodium acetate are hydrogenated with Raney nickel at 110° C. and 50 atm. pressure until a sample no longer shows any coupling action in alkaline soda solution with oxidized color developer; the hydrogenation product is then introduced into 800 cc. of 5% hydrochloric acid, and the solid obtained is filtered off with suction, stirred with acetone, filtered with suction and dried. Its melting point is 248–251° C.

The compound is dissolved as in Example 6 and the resulting solution is added to a silver halide emulsion; the emulsion obtained is cast on a support and the resulting emulsion layer is dried. The further processing can take place either as described in Example 6 or as described in Example 7; in both cases a positive yellow image is obtained.

Example 12

5.2 g. of 4-aminophenetol hydrochloride are diazotized in the usual manner and the diazotization product is coupled at 0° C. with 14.7 g. of 1-(4'-sulpho-phenyl)-3-heptadecyl-4-methyl-pyrazolone-5 as described in Example 6. The compound becomes darker in color from 185° C.

16 g. of this compound are dissolved as described in Example 6, and the resulting solution is added to a silver halide emulsion; the emulsion obtained is cast on a support and the resulting emulsion layer is dried. The further processing can take place as described in Example 6 or Example 7; a positive yellow image is obtained in both cases.

Example 13

4.1 g. of 4-nitroaniline are diazotized in the usual manner and the diazotization product is added to a solution of 15.7 g. of 1-(3'-sulpho-4'-phenoxyphenyl)-3 - heptadecyl-4-methyl pyrazolone-5, 30 cc. of methanol and about 5 g. of sodium acetate. Immediately after combining the two solutions, yellowing occurs, but it is only after some hours that an oily product separates out, this oil becoming solid on triturating with sodium chloride solution. The solid is filtered off with suction, washed with sodium chloride solution and dried in a drier.

The 1-(3'-sulpho-4'-phenoxy phenyl)-3-heptadecyl - 4-methyl pyrazolone-5 is obtained by condensation of 3-sulpho-4-phenoxyphenyl hydrazine with α-methyl stearoyl acetic ester, which can also be obtained in known manner by alkylation of stearoyl acetic ester with for example dimethyl sulphate.

The solution is formed, and processing takes place, as described in Example 6 or 12; a positive yellow image is obtained.

Example 14

4.1 g. of the sodium salt of 4,4'-diaminostilbene-2,2'-disulphonic acid are dissolved in 50 cc. of water. 1.4 g. of sodium nitrite are added to the neutral to slightly alkaline solution and the resulting mixture is cooled to 5–10° C. It is then diazotized by adding 4 cc. of concentrated hydrochloric acid. The suspension of the diazonium salt formed is introduced at room temperature into the following solution:

3.8 g. of 1-α-pyridyl-3,4-dimethyl pyrazolone are dissolved while hot in 30 cc. of methanol and poured into 100 cc. of 10% soda solution.

After addition of the diazonium salt solution, stirring is continued for half an hour and 100 cc. of saturated sodium chloride solution are added. The product initially precipitates in the form of a resin, which becomes solid after standing for some time in air. This resin can be incorporated into photographic materials as indicated in Examples 6 to 9. After exposure and development, a positive yellow image is obtained.

The 1-α-pyridyl-3,4-dimethyl pyrazolone is produced as follows:

10 g. of α-pyridyl hydrazine and 14 g. of α-methyl acetoacetic acid ethyl ester are boiled in 150 cc. of toluene for two hours in a vessel fitted with a water separator. After the toluene has been distilled off, the residue is triturated with 75 cc. of petroleum ether and the mixture obtained is placed for 1 hour in ice. The solid component is filtered off with suction, and then washed twice with petroleum ether. M.P.: 108–110° C.

Example 15

The suspension of the diazonium salt produced as described in Example 14 is introduced into the following solution:

4.8 g. of 1-(4'-α-methyl quinolyl)-3,4-dimethyl pyrazolone are dissolved while hot in 40 cc. of methanol. The solution is poured into 100 cc. of 10% soda solution and a suspension is formed which changes into a clear solution when the aforementioned introduction of diazonium salt takes place. Stirring is continued for half an hour and the dye is caused to separate out by adding 150 cc. of saturated sodium chloride solution. The dye can be incorporated into photographic materials as indicated in Examples 6 to 9; the resulting material yields a positive yellow image after being exposed and developed.

The 1-(4'-α-methyl quinolyl)-3,4-dimethyl pyrazolone is produced as follows:

16 g. of 2-hydrazino-4-methyl quinoline and 14 g. of α-methyl acetoacetic acid ethyl ester are boiled in 100 cc. of toluene for two hours in a vessel fitted with a water separator. After cooling, the pyrazolone crystalises out. M.P. 140–144° C.

Example 16

In a multi-layer color film, the uppermost blue-sensitive silver halide layer contains 4-(stearoylamidobenzoyl acetanilide)-3',5'-dicarboxylic acid, the first green-sensitive silver halide layer contains the component described in Example 6, the second green-sensitive silver halide layer contains 1-(4'-phenoxy-3-sulpho)-phenyl-3-heptadecyl pyrazolone-5 and the red-sensitive silver halide emulsion layer contains the 2-N-methyl-N-octadecyl-amino-5'-sulphoanilide of 1-hydroxy-2-naphthoic acid. The film is further processed as described in Example 6. A sensitometric test shows that excellent color correction of the secondary sensitivity of the magenta component is obtained. In analogous manner, the blue absorption of the cyan component can be corrected and, with suitable red-green sensitization of that layer which yields a positive yellow image, both the blue absorption of the cyan component and that of the magenta component can be corrected.

Example 17

10.6 grams of 2-amino-5-acetamino-4'-hydroxy-3'-carboxydiphenylsulfone are dissolved in 40 cc. of water and 32 cc. of 1 N aqueous solution of sodium hydroxide. After adding 2.4 grams of sodium nitrite the solution obtained is dropped at 0° C. to 4° C. into a mixture of 30 cc. of concentrated hydrochloric acid and 30 cc. of water. After ½ hour the superfluous sodium nitrite is destroyed by addition of amido sulfonic acid. After adjusting the solution to a pH value of 6 by means of sodium acetate it is added at 0° C. to a solution of 17.8 grams of 1-(2'-benzthiazolyl-5'-sulfo)-3-heptadecyl - 4 - β - cyanoethyl-pyrazolone-5 and 8 grams of sodium acetate in 300 cc. of methanol. After ½ hour the pH value is adjusted to 10 by adding dropwise a 25% solution of sodium hydroxide, whereafter the reaction product is precipitated by addition of a 25% sodium chloride solution. The solid obtained is filtered off with suction, washed with sodium chloride solution and dried.

12 grams of this compound are dissolved as described in Example 6, and the resulting solution is added to 1 kilogram of a silver halide emulsion. The emulsion obtained is cast on a film support, and the resulting emulsion layer is dried. After the exposure the film is developed, rinsed, fixed and rinsed as described in Example 7, and a positive red image is obtained.

The 1-(2'-benzthiazolyl - 5' - sulfo)-3-heptadecyl-4-β-cyanoethyl-pyrazolone-5 is produced as follows:

A solution of 100 grams of 1-(2'-benzthiazolyl-5'-sulfo)-3-heptadecyl-pyrazolone-5 and 20 cc. of acrylonitrile in 1000 cc. of propanol and 300 cc. of a solution of sodium methylate (2 grams of sodium in 400 cc. of methanol) is heated in an autoclave for 4 hours at 130–140° C. After cooling to room temperature the solution is added to a mixture of 150 cc. of concentrated sulfuric acid and 800 cc. of propanol. After standing over night the precipitate is filtered off with suction, boiled with 1000 cc. of acetone and dried.

Example 18

3.6 grams of 3-aminobenzonitrile are diazotized as described in Example 6. After addition of the sodium nitrite solution the superfluous nitrite is destroyed. Thereafter the diazonium salt solution is adjusted to a pH value of 6 by means of sodium acetate and then added at 0° C. to a solution of 18.8 grams of 1-(4'-phenoxy-3'-sulfophenyl)-3-heptadecyl-4-β-cyanoethyl-pyrazolone-5 and 8 grams of sodium acetate in 300 cc. of methanol. The precipitate formed is filtered off with suction, washed with a sodium chloride solution and dried.

12 grams of the compound thus obtained are dissolved and added to 1 kilogram of a silver halide emulsion and worked up as described in Example 17. There is obtained a positive yellow image.

The 1 - (4' - phenoxy-3'-sulfophenyl)-3-heptadecyl-4-β-cyanoethyl-pyrazolone-5 is obtained by following the description given in Example 17, whereby the 1-(2'-benzthiazolyl-5'-sulfo)-3-heptadecyl-pyrazolone-5 is replaced by 100 grams of 1-(4'-phenoxy-3'-sulfophenyl)-3-heptadecyl-pyrazolone-5.

Example 19

5.6 grams of 3-aminotoluene-ω-sulfonic acid are diazotized. After destroying the superfluous sodium nitrite the solution is adjusted by means of sodium acetate to a pH value of 6, and the solution is added at 0° C. to a solution of 18.8 grams of 1-(4'-phenoxy-3'-sulfophenyl)-3-heptadecyl-4-β-cyanoethyl-pyrazolone-5 as described in Example 18. To the combined solutions is added drop by drop a 20% aqueous solution of potassium hydroxide until a pH value of 10 is obtained. The reaction product is precipitated by a saturated solution of potassium chloride. The precipitate obtained is filtered off with suction, washed with potassium chloride solution and dried.

12 grams of the compound are dissolved and added to 1 kilogram of a silver halogenide emulsion and worked up as described in Example 17. There is obtained a positive yellow image.

Instead of the 1-(4'-phenoxy-3'-sulfophenyl)-3-heptadecyl-4-β-cyanoethyl-pyrazolone-5 there may also be used the 1-(3'-lauroylaminophenyl)-3-methyl-4-β-oxethyl-pyrazolone-5 which is produced as follows:

44 g. of nitrophenylhydrazine sulfate are dissolved in 150 cc. of hot water. The solution is added to a boiling mixture of 26 g. of acetobutyrolactone and
400 cc. of methanol. One boils for 2 hours, allows to cool and filters off the precipitate formed with suction.
50 g. of the above pyrazolone are dissolved in
300 cc. of methanol and hydrogenated in the presence of Raney nickel at first at room temperature, at the end at 70° C. until no further hydrogen is taken up. After filtering off the Raney-nickel the methanol is distilled off and the residue is triturated with acetone. Its melting point is 174–177° C.
25.5 g. of the resulting amine are dissoloved in
250 cc. of dry pyridine. Thereafter
21.9 g. of lauric acid chloride are added dropwise at room temperature.

After stirring for 1 hour the solvent is distilled off in vacuum. The tough residue is added to 300 cc. of 2 N hydrochloric acid, filtered off, the residue which is now crumbly is washed with 2 N hydrochloric acid, dissolved in 3% aqueous solution of sodium hydroxide and acidified with hydrochloric acid. After filtering the compound is dried in vacuum.

Example 20

11.2 grams of 2-amino-4'-hydroxy-3'-carboxy-diphenyl-sulfone-sulfonic acid-4 are dissolved in 60 cc. of a 1 N sodium hydroxide solution and 60 cc. of water. To this solution there are added 2.1 grams of sodium nitrite. The solution obtained is added drop by drop to a mixture of 60 cc. of concentrated hydrochloric acid and 30 cc. of water. After ½ hour the superfluous sodium nitrite is destroyed, the diazonium salt is filtered off with suction and added at 0° to a solution of 17.2 grams of 1-(4'-phenoxy-3'-sulfophenyl)-3-heptadecyl-4 - methyl - pyrazolone-5 in 300 cc. of a 2 N aqueous sodium hydroxide solution. After ½ hour the reaction product is precipitated by addition of a 25% aqueous sodium chloride solution, and the precipitate is filtered off with suction. The precipitate is dissolved in water and precipitated once more by addition of a sodium chloride solution, filtered with suction and dried. 15 grams of this compound are dissolved in 500 cc. of water and added to 1 kilogram of a silver halogenide emulsion. The emulsion is worked up as disclosed in Example 17. There is obtained a positive yellow image.

Example 21

7.6 grams of 4-amino-diphenyl-sulfonic acid-3 are diazotized. After destroying the superfluous nitrite, the diazonium solution is adjusted to a pH value of 6 by addition of sodium acetate, and added at 0° C. to a solution of 17.2 grams of 1-(4'-phenoxy-3'-sulfophenyl)-3-heptadecyl-4-methyl-pyrazolone-5 and 8 grams of sodium acetate in 300 cc. of methanol. A yellow compound precipitates which is dissolved by addition of a 10% aqueous sodium hydroxide solution. The compound is precipitated by addition of aqueous potassium hydroxide and precipitated by addition of aqueous potassium hydroxide and potassium chloride solution, the precipitate is filtered off with suction, washed with a potassium chloride solution and dried. 15 grams of this compound are dissolved and added to a silver halogenide emulsion. The emulsion obtained is worked up according to the description of Example 17. There is obtained a yellow positive image.

Example 22

7.2 grams of 4-amino-azobenzene-carboxylic acid-4' are diazotized. After destroying the superfluous sodium nitrite, the diazonium salt is filtered off with suction and added at 0° C. to a solution of 17.2 grams of 1-(4'-phenoxy-3'-sulfophenyl)-3-heptadecyl-4-methyl - pyrazolone-5 in 300 cc. of 2 N sodium hydroxide solution. After 1 hour the reaction product is precipitated with dilute hydrochloric acid, filtered off with suction and dried. 15 grams of this compound are dissolved, and the solution obtained is worked up according to the description given in Example 6. There is obtained a positive yellow image.

Example 23

4.1 grams of 3-aminobenzoic acid are diazotized and added at 0° C. to a solution of 14.7 grams of 1-(4'-sulfophenyl)-heptadecyl-4-methyl-pyrazolone-5 in 300 cc. of methanol and 8 grams of sodium acetate. To the reaction mixture are added a 25% aqueous sodium hydroxide solution until the reaction product has dissolved. After 1 hour the reaction product is precipitated by dilute hydrochloric acid. The compound obtained is worked up as disclosed in Example 22. There is obtained a yellow positive image.

Example 24

9.6 grams of 3-amino-4-methyl-4'-nitro-diphenylamine-2'-sulfonic acid are diazotized and coupled with 17.2 grams of 1-(4'-phenoxy-3'-sulfo-phenyl)-3-heptadecyl-4-methyl-pyrazolone-5 as described in Example 21. The reaction product obtained is precipitated by addition of saturated potassium chloride solution, filtered off with suction and dried. 16 grams of this compound are dissolved and added to 1 kilogram of a silver halogenide emulsion. Thereafter the emulsion is worked up as described in Example 17. There is obtained a yellow positive image.

Example 25

15.6 grams of sodium salt of 2-amino-4'-methyl-diphenyl-sulfone-4-sulfonic acid are dissolved in 300 cc. of water. To the solution obtained there are added 3.3 grams of sodium nitrite. The solution obtained is added drop by drop at 0° C. to 4° C. to a mixture of 45 cc. of water and 60 cc. of concentrated hydrochloric acid. After ½ hour the superfluous nitrite is destroyed and sodium acetate is added until a pH value of 6 is obtained. This mixture is added at 0° C. to a solution of 25.8 grams of 1-(4'-phenoxy-3'-sulfophenyl)-3-heptadecyl-4-methyl-pyrazolone-5 and 12 grams of sodium acetate in 400 cc. of methanol. After ½ hour the reaction product is precipitated by addition of a 40% aqueous potassium hydroxide solution. The precipitate is filtered off with suction, dissolved again in a 5% aqueous solution of acetic acid and precipitated by addition of a saturated potassium chloride solution. The precipitate is filtered off with suction and dried. The compound obtained is worked up according to the description given in Example 17. There is obtained a positive yellow image.

Example 26

3.6 grams of 3-aminobenzonitrile are diazotized. After destroying the superfluours sodium nitrate the diazonium solution is adjusted to a pH value of 6 and added at 0° C. to a solution of 17.2 grams of 1-(4'-phenoxy-3'-sulfophenyl)-3-heptadecyl-4-methyl-pyrazolone-5 as described in Example 21. To the reaction mixture there is added a 10% aqueous solution of sodium hydroxide until a pH value of 10 is obtained. The coupling product is precipitated by means of a 25% solution of sodium chloride. The compound is worked up as described in Example 30. There is obtained a yellow positive image.

Example 27

9 grams of 1-amino-4-acetamino-3'-carboxy-4'-hydroxy-diphenylsulfone are dissolved in 80 cc. of water and 15 cc. of 2 N aqueous solution of sodium hydroxide. After adding 1.9 grams of sodium nitrite the solution is added drop by drop at 0° C. to 75 cc. of a 10% aqueous solution of hydrochloric acid. The precipitate formed is filtered off with suction and added to a solution of 5 grams of 2-ethyl-N-ethyl-benzthiazol-tosylate (n-toluene-sulfonate) in 12.5 cc. of water and 50 cc. of a 10% aqueous solution of sodium carbonate. After ½ hour the reaction mixture is adjusted to a pH value of about 7 by means of acetic acid. The precipitate formed is filtered off with suction and reprecipitated twice by dissolving in acetic acid and precipitating with water. Its melting point is 213–216° C.

8 grams of this compound are worked up as described in Example 7. There is obtained a positive yellow image.

Example 28

The quaternary salt obtained from 22 grams of α-brom-propiophenone and 12.5 grams of quinoline is reacted with a diazonium salt obtained from 11.5 grams of 1-amino-5-benzoyl-amino-3'-carboxy-4'-hydroxy-diphenyl-sulfone in 50 cc. of water and 50 cc. of a 10% sodium acetate solution. To the reaction mixture there are added 50 cc. of a 10% aqueous solution of sodium carbonate. The reaction mixture is neutralized by addition of acetic acid, the precipitate formed is filtered off with suction and washed. Its melting point is 170–173° C. After working up the product as described in Example 4 there is obtained a positive yellow image.

Example 29

On a transparent support produced from cellulose acetate there is coated a silver halogenide emulsion which contains per kilogram 15 grams of the sodium salt of the coupling product of 1-(4'-phenoxy-3'-sulfophenyl)-3-heptadecyl-4-methyl-pyrazolone-5 and diazotized 2-amino-4'-methyl-diphenyl-sulfone-4-sulfonic acid, the emulsion being optically sensitized for the green region of the spectrum. On the layer obtained there is coated a silver halogenide emulsion sensitized for the red region of the spectrum which contains per kilogram of emulsion 12 grams of a cyan coupler as for instance 1-hydroxy-2-napthoic acid-(2'-N-methyl-N-octadecylamino-5'-sulfonic-acid)-anilide. On the layer obtained there is coated a silver halogenide emulsion sensitized for the green region of the spectrum, this silver emulsion containing a magenta coupler as for instance 12 grams of 1-(4'-phenoxy-3'-sulfo-phenyl)-3-heptadecyl-pyrazolone-5 per kilogram of the silver halide emulsion. On this layer there is coated a yellow filter layer, for instance a layer of colloidal silver. On the filter layer there is coated a blue sensitive silver halogenide emulsion layer which contains a yellow coupler as for instance 15 grams of 4-methoxy-benzoyl-acetic acid-(2-N-methyl-N-octadecyl-5''-carboxy-anilide per kg. This photographic element is worked up as disclosed in Example 7.

Example 30

On a transparent foil of cellulose acetate there is coated a silver halogenide emulsion which is sensitized for red and green light and which contains per 1 kilogram 15 grams of the reaction product of 1-(4'-phenoxy-3'-sulfophenyl)-3-heptadecyl-4-methyl-pyrazolone-5 and diazotized 3-aminobenzonitrile. On the other side of the support there is built up a three-layer-material as known in the art. It is for instance possible to use for the production of the innermost layer a silver halogenide emulsion containing a yellow coupler as for instance a benzoyl- or acetoacetic acid derivative which contains aliphatic radicals having 12–18 C atoms and a sulfo- or a carboxylic acid group. The middle silver halide emulsion layer contains a magenta coupler as for instance a pyrazolone and the uppermost layer a cyan coupler as for instance a derivative of an α-naphthol, both said couplers containing an alkyl-group having 12–20 C atoms and a carboxylic or sulfonic acid group these couplers being well known in the art. This photographic element is worked up as disclosed in Example 7. The single layer on the backside of the film serves not only as a masking layer but also as an antihalation layer. To improve the antihalation action a green antihalation dyestuff may be added to said layer, thereby effecting a decrease in the red sensitivity of said layer which is desired in view of the relation of the side absorptions of the magenta and cyan partial dyestuff images.

Example 31

On a transparent foil of cellulose acetate there is coated a silver halogenide emulsion which contains per kilogram 15 grams of the coupling product of 1-(4'-phenoxy-3'-sulfophenyl)-3-heptadecyl-4-methylpyrazolone-5 and diazotized 3'-carboxy-4'-hydroxy-2-amino-5-acetaminodiphenylsulfone. The photographic element obtained is exposed, developed in a color forming developer as disclosed in Example 1 and bleached and fixed in a bleaching and fixing bath as disclosed in the German Patent 866,605 in Example 6. Thereafter the material is treated for 2 seconds to 5 minutes with a 5% solution of potassiumferri-cyanide. By this aftertreatment there is obtained an increase in the density and gradation of the positive yellow image produced in said emulsion layer.

The above colored coupler is obtained in the following manner:

10.6 g. of 3'-carboxy-4'-hydroxy-2-amino-5-acetamino-diphenylsulfone are diazotized as disclosed in Example 17. The diazonium salt solution is added at 0° C. to a solution of 17.2 g. of 1-(4'-phenoxy-3'-sulfophenyl)-3-heptadecyl-4-methyl pyrazolone-5 in 300 cc. of methanol containing 8 g. of sodiumacetate. After half an hour 800 cc. of a 25% sodiumchloride solution are added, and the coupled product is precipitated by adding drop by drop 40% aqueous sodium hydroxide solution. The precipitate is sucked off, washed with NaCl solution and dried.

*Example 32*

A photographic material comprising a support and coated on said support a silver halide emulsion layer is exposed to light and developed in the following developer:

3 g. of p-diethylaminoanilinesulfate
2 g. of anhydrous sodium sulfite
1 g. of hydroxylaminesulfate
75 g. of potassiumcarbonate
2 g. of the dye obtained by coupling 2 moles of cyclohexanone-o-oxalylic acid ethyl ester and 1 mole of tetrazotized 1,2-di-(4'-amino-1'-sulfophenyl)-ethane
1000 cc. of water.

After development the material is rinsed and bathed for 15 minutes in the bleaching and fixing bath disclosed in Example 6 of Germany patent specification 866,605. There is obtained a positive yellow image of the object to be reproduced.

Suitable bleaching baths for carrying out the process disclosed in the aforegoing examples have for instance the following composition:

(1) 5 g. of potassiumbichromate
   20 g. of potassiumbromide
   40 g. of alum
   2.5 g. of sodiumacetate (anhydrous)
   60 cc. of acetic acid (pH=3)
   1000 cc. of water
(2) 100 g. of potassiumferricyanide
   15 g. of potassiumbromide
   1000 cc. of water A suitable bleaching and fixing bath is composed as follows:

2.6 g. of the tetrasodiumsalt of ethylenendiamine tetraacetic acid
2.48 g. of anhydrous soda
1.5 g. of crystallized ferrichloride
1.3 g. of anhydrous sodiumsulfite
20 g. of crystallized sodiumthiouslfate
0.5 g. of the reaction product of 50–70 moles of ethyleneoxyde with 1 mole of dimethylamine
50 g. of water Primary aromatic and heterocyclic developing agents are generally suitable for developing the silver halide emulsion layers of the present invention including the phenylene diamines, 4-aminopyrazolones and 3-aminopyrazolines. Of primary importance are the phenylenediamines which may be substituted in one amino group and in the ring. Such compounds are for instance diethylparaphenylenediamine, dimethylparaphenylene diamine, 2-amino-5-diethyl-amino toluene. Also useful are p-aminophenol, 1-(4'-aminophenyl)-3-aminopyrazoline and 4-amino-1-phenyl-pyrazolone.

Among the colored couplers those of special value which are obtained by coupling a 1-aryl-3-alkyl-4-alkyl pyrazolone with a diazonium or tetrazoniumsalt obtained from an aromatic or heterocyclic amine. In the pyrazolone the alkyl group in 3-position may have 1–20 carbon atoms, whereas in 4-position the pyrazolone may be substituted be a methyl, ethyl, propyl, butyl or a substituted alkyl group such as cyanoethyl. Suitable heterocyclic amines for preparing the diazonium salt solution are for instance 2-aminobenzthiazole, 4-aminopyrazole, 4-amino-1-phenylpyrazolone, 3-aminoindazole, aminopyridine, aminotriazole, aminotetrazole and 3-amino-2,5-diphenylpyrrole.

We claim:

1. A process of producing color images in a silver halide emulsion layer which comprises incorporating in said layer an azo dye in which the azo group is linked to the activated carbon of an activated methylene structure of a photographic color coupler but in which structure one hydrogen of the methylene carbon is substituted by said azo group of the azo dye, and the other hydrogen of the methylene carbon is substituted by a radical selected from the class consisting of alkyl, cycloalkyl, aralkyl and aryl radicals so that the dye undergoes coupling with the oxidation products of a primary amine developer to split off the azo group from the methylene structure and form a colorless coupling product, exposing said layer to an image to be reproduced, developing the resulting layer with a primary amine color developer to reduce the silver halide in the areas of the image illuminated by the exposure and to simultaneously cause the colored color coupler to become decolorized in said areas.

2. A process of producing direct positive color images in a silver halide emulsion layer which comprises incorporating in said layer an azo dye in which the azo group is linked to the activated carbon of an activated methylene structure of a photographic color coupler but in which structure one hydrogen of the methylene carbon is substituted by said azo group of the azo dye, and the other hydrogen of the methylene carbon is substituted by a radical selected from the class consisting of alkyl, cycloalkyl, aralkyl and aryl radicals so that the dye undergoes coupling with the oxidation products of a primary amine developer to split off the azo group from the methylene structure and form a colorless coupling product, exposing said layer to an image to be reproduced, developing the resulting layer with a primary amine color developer to reduce the silver halide in the areas of the image illuminated by the exposure and to simultaneously cause the colored color coupler to become decolorized in said areas, then bleaching and fixing said layer.

3. A process according to claim 2, wherein the bleaching is effected by means of a bleaching agent selected from the group consisting of ferricyanide and bichromate bleaching baths.

4. A process according to claim 2, wherein the activated methylene group is in a pyrazolone ring.

5. The process of claim 2 wherein the activated methylene structure is in a cyclopentanone ring.

6. The process of claim 2 wherein the activated methylene structure is in a cyclohexanone ring.

7. The process of claim 2 wherein the activated methylene structure is in a hydrindone ring.

8. A process according to claim 2, wherein a noncolored color coupler is also present in the emulsion and forms a negative color image during development.

9. A process according to claim 1, wherein the emulsion is part of a combination of superposed silver halide emulsion layers which are sensitized to different regions of the spectrum.

10. A process according to claim 1, wherein the emulsion is a filter layer of a multi-layer color film.

11. A process according to claim 1, wherein the activated methylene structure is in a 1-aryl-3-alkyl-4-alkyl pyrazolone-5 ring.

12. A silver halide emulsion layer containing a colored azo dye in which the azo group is linked to the activated carbon of an activated methylene structure of a photographic color coupler but in which structure one hydrogen of the methylene carbon is substituted by said azo group of the azo dye, and the other hydrogen of the methylene carbon is substituted by a radical selected from the class consisting of alkyl, cycloalkyl, aralkyl and aryl radicals so that the dye undergoes coupling with the oxidation products of a primary amine developer to split off the azo group from the methylene structure and form a colorless coupling product.

13. The process of claim 1 wherein the methylene structure is a ring selected from the class consisting of cyclopentanone and cyclohexanone rings which are substituted in a 2-position by a radical selected from the class consisting of carboxylic ester, carboxylic amide, oxalylic ester and oxalylic amide groups.

14. The process of claim 1 in which the methylene structure is in an alpha hydrindone ring having an oxalylic ester group substituted in the beta position.

References Cited in the file of this patent
UNITED STATES PATENTS

| | | |
|---|---|---|
| 2,434,272 | Jelley et al. | Jan. 13, 1948 |
| 2,808,329 | Whitmore | Oct. 1, 1957 |

UNITED STATES PATENT OFFICE

CERTIFICATE OF CORRECTION

Patent No. 3,028,238            April 3, 1962

Walter Püschel et al.

It is hereby certified that error appears in the above numbered patent requiring correction and that the said Letters Patent should read as corrected below.

Column 9, line 40, for "nitrile" read -- nitrite --; column 10, line 23, for "-3-sulpho)-" read -- -3'-sulfo)' --; column 15, line 44, for "sodiumthiouslfate" read -- sodiumthiosulfate --.

Signed and sealed this 4th day of September 1962.

(SEAL)
Attest:

ERNEST W. SWIDER
Attesting Officer

DAVID L. LADD
Commissioner of Patents